Dec. 15, 1936.  C. A. BIELING ET AL  2,064,287
COIL WINDING MACHINE
Filed May 3, 1934  4 Sheets-Sheet 2

INVENTORS: C. A. BIELING
C. D. RICHARD
BY J. MacDonald
ATTORNEY

Dec. 15, 1936.  C. A. BIELING ET AL  2,064,287
COIL WINDING MACHINE
Filed May 3, 1934  4 Sheets-Sheet 3
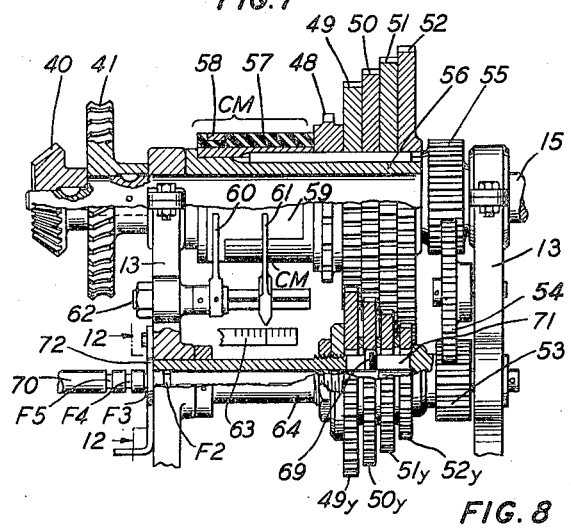
INVENTORS: C.A.BIELING
C.D.RICHARD
BY J. MacDonald
ATTORNEY Dec. 15, 1936.  C. A. BIELING ET AL  2,064,287
COIL WINDING MACHINE
Filed May 3, 1934     4 Sheets-Sheet 4
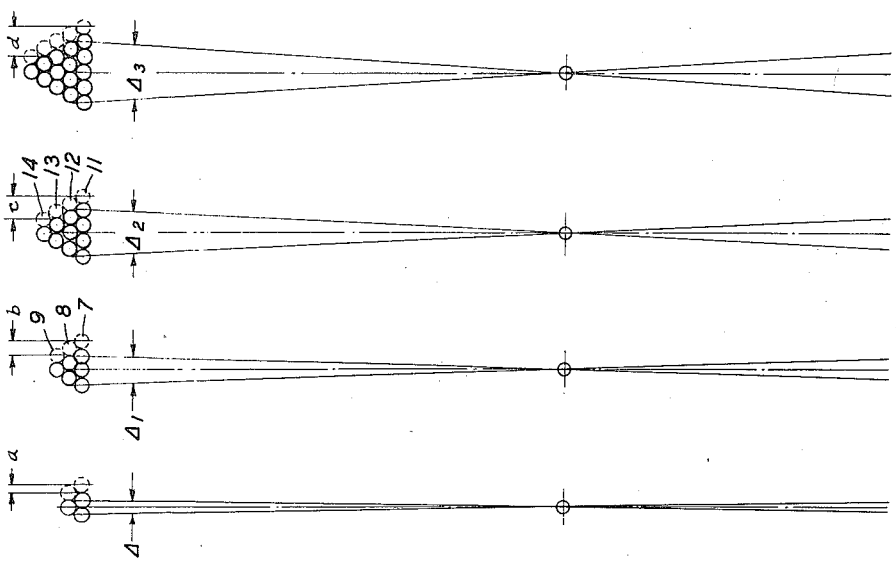
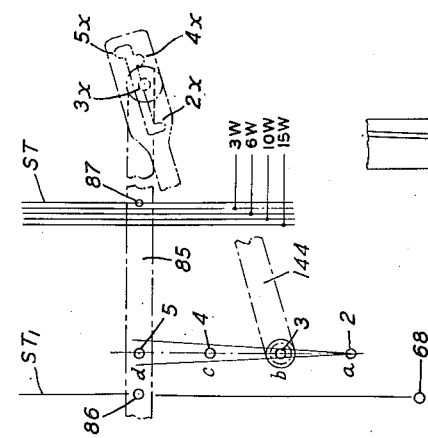
INVENTORS: C.A.BIELING
C.D.RICHARD
BY J. MacDonald
ATTORNEY Patented Dec. 15, 1936

2,064,287

UNITED STATES PATENT OFFICE 2,064,287

COIL WINDING MACHINE

Carl A. Bieling, Elizabeth, N. J., and Charles D. Richard, West New Brighton, N. Y., assignors to Bell Telephone Laboratories, Incorporated, New York, N. Y., a corporation of New York Application May 3, 1934, Serial No. 723,690

13 Claims. (Cl. 242—9)

This invention relates to coil winding machines.

In the hand winding of bank wound coils having three layers for example, two turns of wire are wound adjacent each other in the ordinary manner on a core and the wire deviated from its movement toward the starting end of the core for winding one turn at the intersecting point of the wire previously coiled, after which the direction of the wire is again deviated in opposite direction for winding one turn and again deviated towards the starting end of the core for winding two turns in superposed relation when the wire is again deviated for the winding of three turns in superposed relation, the cycle of operation for the winding of the three last turns being continued to the completion of the coil at the other end of the core.

The winding of coils of the bank wound type manually has been found to be an extremely slow and costly operation and the object of this invention is to provide an automatically operating machine for winding such coils which will be simple, efficient in operation, and cheap to manufacture.

In the drawings Fig. 1 is a front assembly view showing the supporting bench and a number of operating parts with portions cut away;

Fig. 6 is a longitudinal sectional view taken on line 6—6 of Fig. 1;

Fig. 7 is a partial view of the machine showing a number of parts in section;

Fig. 8 is an exploded enlarged partial view of Fig. 7;

Fig. 9 is an enlarged view of a magnetic clutch used in this machine shown partly in section;

Figs. 10, 11 and 12 are detailed views;

Fig. 13 is a diagrammatic view of a guide wire movement adjusting mechanism;

Fig. 14 is a developed view of a cam used for operating the guide wire mechanism for winding a predetermined portion of the coil;

Fig. 15 is a developed view of another cam for the winding of the complementary portion of the coil;

Figs. 16A, 16B, 16C and 16D are detailed views of portions of coils obtained by the operation of these cams; and Fig. 17 is a view of a completed coil shown partly in section.

Figure 1:
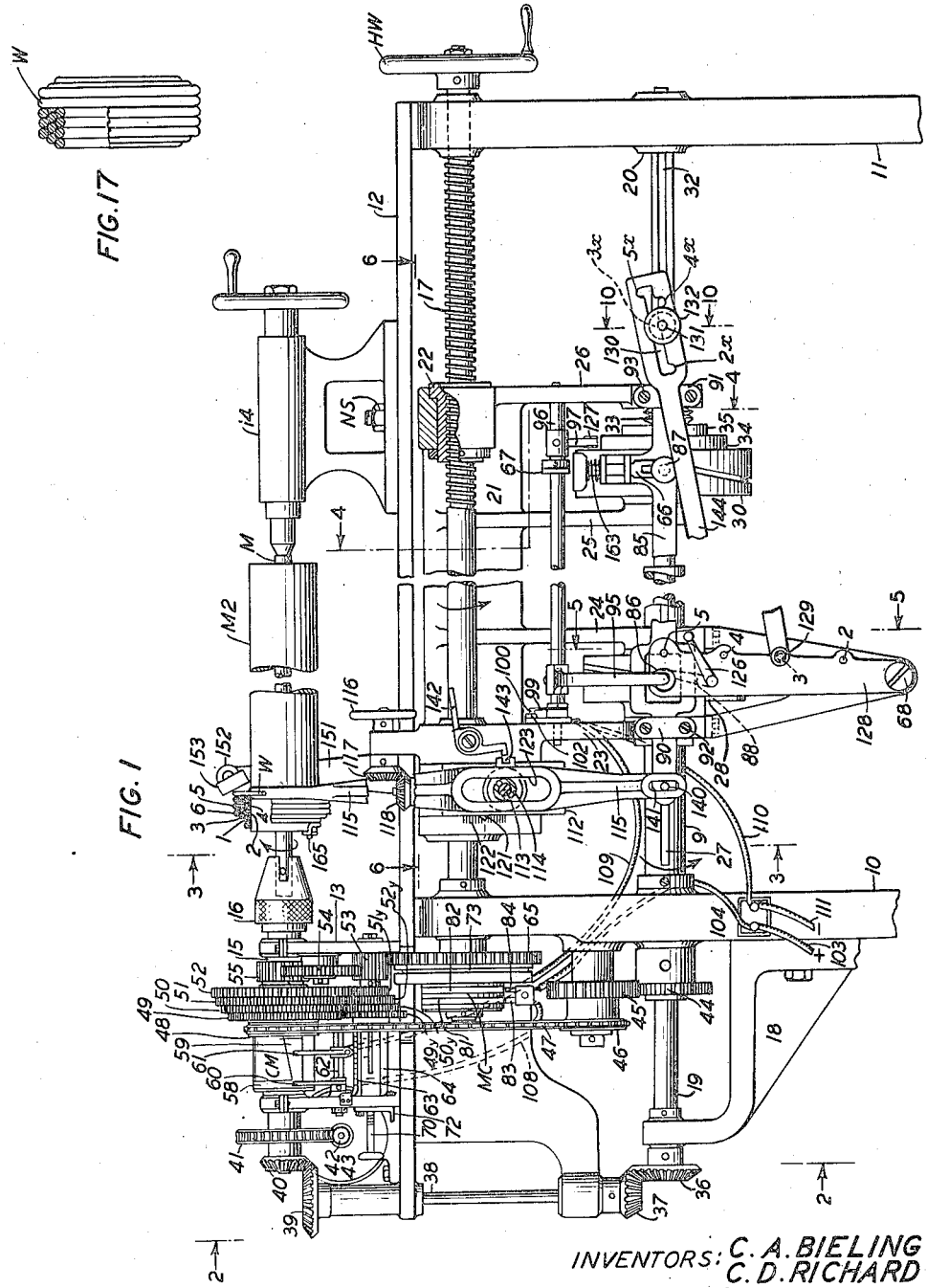

As shown in the drawings two upright supports 10 and 11 cooperate with slide rest members 12 to form a bench for supporting a head stock assembly 13 and a tail stock 14.

The tail stock 14 which is of ordinary construction is slidably mounted on the slide rest members 12 and is secured at any point therealong by a nut screw NS.

The head stock 13 is provided with a spindle or arbor 15 carrying a chuck 16 provided for securing one end of a mandrel M, the other end of this mandrel being supported by the tail stock 14 as shown in Fig. 1 and on this mandrel is mounted a core M2 on which the wire W is wound in a manner that will be hereinafter described in detail.

A bracket 18 which is secured to the upright 10 is provided for supporting one end of a shaft 19, the other end of this shaft being journaled in a bearing portion 20 formed with the upright support 11.

On upright supports 10 and 11 is journaled a lead screw 17 having its ends extending outwardly therefrom for mounting a handwheel HW and clutch MC, Figs. 1 and 9.

A carriage 21 is mounted on lead screw 17 and is moved thereby in a line parallel to the axis of mandrel M through the engagement of this screw with a similarly screw threaded bushing 22 secured in a laterally extending portion of carriage 21, this carriage being actuated intermittently in line parallel with respect to mandrel M by a gearing mechanism under control of the clutch MC as will be hereinafter described in detail.

The carriage 21 is provide with two pairs of downwardly extending lever arms 23—24 and 25—26. The pair of arms 25—26 is provided with bearing portions fitting on the shaft 19 and the pair of arms 23—24 with bearing portions engaging a sleeve 9, concentrically mounted on shaft 19.

Figure 3:
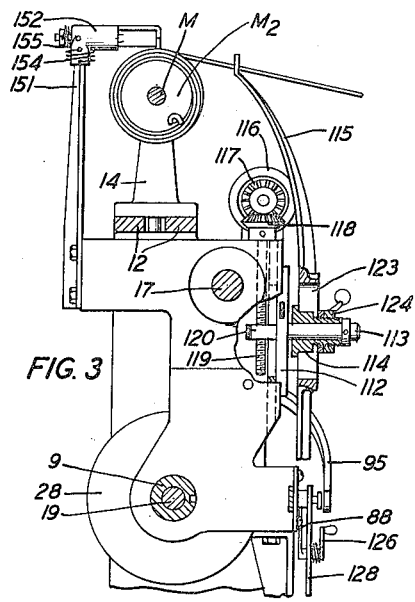
Fig. 3 is a cross-sectional view taken on line 3—3 of Fig. 1.
Figure 4:
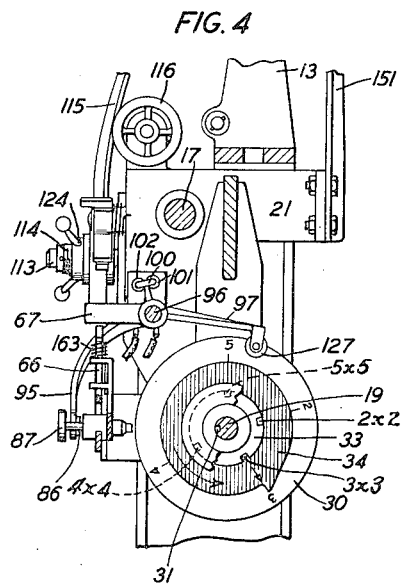
Fig. 4 is a cross-sectional view taken on line 4—4 of Fig. 1.
Figure 5:
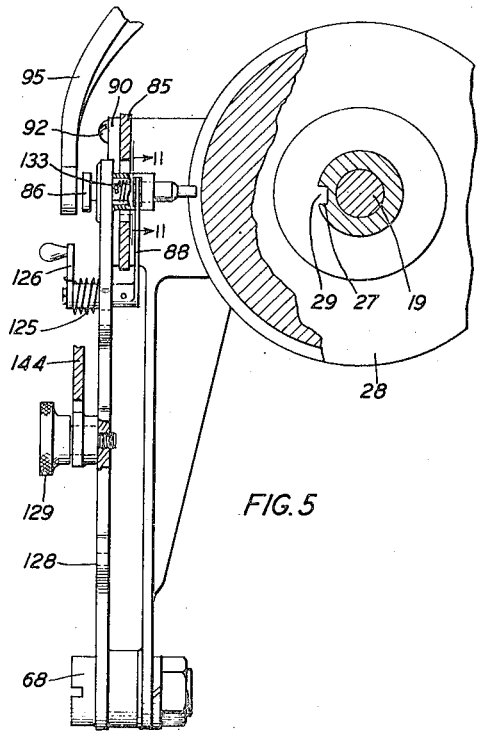
Fig. 5 is a cross-sectional view taken on line 5—5 of Fig. 1 enlarged.

On sleeve 9 between the arms 23—24 is mounted a cam 28 (Figs. 1, 3 and 5) adapted to be moved laterally thereon upon the movement of carriage 21, but held against rotary movement on this sleeve by a lug 29 engaging a keyway 27 shown in Figs. 1 and 5 and on shaft 19 between the arms 25—26 is mounted a cam 30, Figs. 1 and 4, adapted to be moved laterally thereon upon the movement of carriage 21, this cam like cam 28 being held against rotary movement on shaft 19 through the engagement of a lug 31 engaging a keyway 32 as shown in Fig. 4. Cam 30 is provided with a hub portion 33 provided with differently spaced keyways $2x2$, $3x3$, $4x4$, and $5x5$, defining reference points provided for the setting of a cam 34 mounted thereon according to the number of layers required for the winding of a particular coil, a nut 35 engaging the screw threaded portion of hub 33 being provided for securing cam 34 in either of these positions, that is, 2x2, 3x3, 4x4, and 5x5 for the winding of a two, three, four and five-layer coil.

The shaft 19 and the cam 30 operated thereby are actuated through a gearing mechanism including the bevel gears 36 and 37 (Fig. 1), the shaft 38 and the bevel gears 39 and 40, the worm gear 41 keyed to the head stock arbor 15 and the worm screw 42 carried by the armature shaft of motor 43, the speed ratio of this gear train being of the order of 15 to 1, that is, fifteen turns of mandrel M for one turn of cam 30.

The sleeve 9 and the cam 28 operated thereby are actuated by a gearing mechanism including the gears 44 and 45, the latter being securely mounted on the hub of a sprocket wheel 46, the sprocket wheel 48 and one of the gears 49, 50, 51 and 52, respectively, engaging with the selectively driving gears 49y, 50y, 51y and 52y, the gear 53, the intermediate gear 54 and the gear 55 formed integrally with the arbor 15 of the head stock 13. As shown in Figs. 7 and 8 the sprocket wheel 48 and the gears 49, 50, 51 and 52 are keyed on a sleeve 56 rotatably mounted on the arbor 15 and on this sleeve is securely mounted a ring 57 of insulating material having embedded therein a conducting ring 58 formed integrally with a segmental portion 59 of progressively varying width. The ring 58 and the segmental portion 59 are engaged by respective brushes 60 and 61 mounted on a stud 62 with brush 61 laterally adjustable on stud 62 with respect to the segmental portion 59 such adjustment being indicated by a scale 63 defining movement of the carriage 21 according to a range of wire sizes which may be used for the winding of a particular coil, as will be hereinafter described in detail.

The gear 53 is formed integrally with a hollow rotatable shaft 64, Figs. 1, 7 and 12, journaled at both ends in head stock 13 and on this shaft is mounted for independent rotating movement thereon the gears 49y, 50y, 51y and 52y which may be selectively locked with shaft 64 by a key 69 carried by an axially movable or gear selecting rod 70 and extending through a slot 71 in the wall of hollow shaft 64 in engagement with keyways in the bearing surfaces of gears 49y, 50y, 51y and 52y as shown and a latching plate 72 which is pivotally mounted on the head stock 13 selectively engages annular grooves F2, F3, F4 and F5 in rod 70 for holding it and the pin 69 carried thereby in selected position with respect to gears 49y, 50y, 51y and 52y depending upon the number of layers of the coil to be wound on the core M2, that is, two, three, four and five layers, the speed ratio of cam 28 and the commutator CM thus formed with respect to arbor 15 and therefore the coil core M2 being as follows:

(1) Gear 52y engaged with gear 52, 5 to 1 used for the winding of a five-layer coil;
(2) Gear 51y engaged with gear 51, 4 to 1 used for the winding of a four-layer coil;
(3) Gear 50y engaged with gear 50, 3 to 1 used for the winding of a three-layer coil; and
(4) Gear 49y engaged with gear 49, 2 to 1 used for the winding of a two-layer coil.

Figure 2:
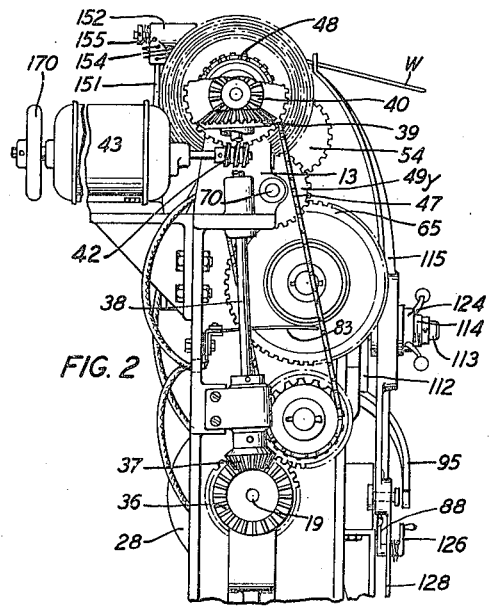
Fig. 2 is a left end assembly view showing a number of operating parts with portions cut away.

On one end of lead screw 17 there is mounted for normally free movement thereon a gear 65 shown in Figs. 1, 2 and 9 which is driven by gear 55 of arbor 15 through gears 54 and 53. Gear 65 carries a steel ring 73 which may be attracted by an armature-shaped disc 74 upon the energization of an electromagnet 75 mounted securely on the reduced end portion of lead screw 17. Disc 74, however, is prevented from relative angular movement with respect to gear 65 by a number of laterally extending pins or studs such as 76, loosely fitting in registering holes 77 in the gear 65 and on the drum-shaped portion 80 of armature disc 74 is insulatingly mounted a pair of slip rings 81 and 82 to which the ends of the wire of magnet 75 are connected, the rings 81 and 82 being engaged by respective brushes 83 and 84 forming part of the operating circuit of magnet 75.

The energization of magnet 75 through a circuit that will be hereinafter described in detail but which includes the segmental portion 59 of commutator CM above mentioned is effective to attract the ring 73 for rendering the movement of gear 65 effective for operating the lead screw 17 and thereby causing the intermittent movement of carriage 21, the movement of the carriage being thus a function of, (1) the width of segmental portion 59 at its point of contact with the brush 61, (2) the angular velocity of gear 65, and (3) the pitch of lead screw 17 so combined as to obtain a linear distance or each step of the carriage to correspond with an intermediate size of wire W.

The energizing circuit of magnet 75 is as follows: from the plus sign of a current supply, the wires 103 and 104, the brush 84, the slip ring 82, the winding of coil 75, the slip ring 81, the brush 83, the wire 108, the brush 60, the slip ring 58, the segmental portion 59 when in engaged relation with the brush 61, the wire 109, the contacts 101 and 102 when bridged by the contact piece 100 carried by lever 99, the wires 110 and 111 to the negative side of the current source.

In the lower end portions of arms 23 and 26 of carriage 21 there is mounted a laterally slidable bar 85 which is held in place therein by plates 90 and 91 in turn secured to these arms by screws such as 92 and 93. Bar 85 carries a plunger 87 manually movable in engageable relation with the cam 30 and held in engaged relation therewith against the resistance of a retracting spring (not shown) by a latching plate 66 mounted in a guiding portion of bar 85 as shown in Fig. 1. This plate is adapted to be moved downwardly against the resistance of a spring 163 by a lever member 67 carried by a shaft 96, which is journaled in arms 23 and 26 of carriage 21. Arms 23 and 24 of this carriage extend downwardly in a V formation for receiving a shoulder screw 68 provided for pivotally mounting a lever member 128 shown in Figs. 1, 2, 3 and in an enlarged view in Fig. 5. On the free end of this lever is mounted a plunger 86 which is axially movable in engaged relation with the cam 28 through the operation of a lever member 95 secured on shaft 96. This plunger is locked in its engaged relation with the cam 28 by a latching lever 88 which engages a slot S (Fig. 11) in the periphery of the plunger under the tension of a spring 125 and a handle 126 is provided for manually releasing this plunger at the end of each winding operation, the retracting movement of plunger 86 being effected automatically by a spring 133.

The movement of shaft 96 and thereby the engagement of plunger 86 with the cam 28 and the simultaneous release of plunger 87 by the plate 66 is effected by the operation of cam 34 engaging a roller 127 at the end of lever arm 97 securely mounted on the shaft 96. The lever 128 is operatively connected to the bar 85 by a rod 144 shown in Figs. 1 and 5 and diagrammatically in Fig. 13. This bar is provided at one end with a pivot in the form of a knob 129, having a threaded portion for engaging any one of a plurality of similarly threaded holes 2, 3, 4 and 5 in lever 128. The other end of rod 144 is provided with a slot 130 having a number of notches $2x$, $3x$, $4x$ and $5x$ for selectively receiving the securing portion of a stud 131 shown in Figs. 1 and 10 which is clamped to the rod between its knob 132 and its disc portion DP (Fig. 10), the rod 144 having a bearing portion $bp$ fitting the pivot portion of stud 131 in order to permit the relative angular movement between the bar 85 and the rod 144.

In the slot 130 the notches $2x$, $3x$, $4x$ and $5x$ represent corresponding connecting positions to holes 2, 3, 4 and 5 in lever member 128 to which the rod 144 is pivoted at its ends in order to secure the proper spaced relation between the plungers 86 and 87 at certain points on the cams 28 and 30 and to obtain the proper amplitude of the bar 85 and thereby of a wire guiding member 115 for the winding of a two, three, four or five-layer coil, as will be hereinafter described in detail.

On carriage 21 there is mounted a vertically movable slide rest 112 shown in Figs. 1, 2, 3, 4 and 6 having a laterally extending spindle 113 for mounting a hub member 114. This hub member is provided with parallel sides fitting the parallel sides of a slot 123 in the yoke-shaped wire guiding member 115, and a nut screw 124 is provided for securing the yoke 115 on the hub 114 within the length of the slot 123 while permitting the free pivotal movement of the hub 114 and therefore of wire guiding member 115 on the spindle 113, the slide rest 112 and the spindle 113 carried thereby being moved in a vertical adjusting position through the operation of a handwheel 116, the miter gears 117 and 118 and the screw 119 shown in Fig. 3 threadedly engaging a nut screw 120 carried by the slide rest 112.

The slide rest 112 is provided with a pointer 121 which cooperates with a scale 122 for readily indicating the adjustment of pivot 113 in order to obtain the proper angular movement of wire guiding member 115 with respect to the size of wire used for the coil, the wire guiding member 115 being held against vertical movement upon the adjustment of spindle 113 by a latching lever 142 engaging a slot 143.

The wire guiding member 115 is connected at its lower end to the bar 85 by a pin 140 engaging the slot 141 so that upon the engagement of plunger 87 with the cam 30 or plunger 86 with the cam 28 the movement of these cams is imparted to the wire guiding member 115 through the bar 85.

As shown in Fig. 14 the cam 30 for convenience in the understanding of the invention is divided into fifteen equal parts each representing an angular distance of twenty-four degrees and since the speed ratio of core M2 to cam 30 as above described is of the order of 15 to 1, each twenty-four degree angular movement of cam 30 is equivalent to one turn of core M2 as indicated by the numerals 1 to 3 in triangle 15H1, 1 to 6 in triangle 15H2, 1 to 10 in triangle 15H3 and 1 to 15 in triangle 15H4, the latter being the equivalent of a complete turn of cam 30. The variations in the angular movements of the wire guiding member 115 when actuated by cam 30 and as represented by the angles $\Delta$, $\Delta_1$, $\Delta_2$, and $\Delta_3$ in Figs. 16A, 16B, 16C and 16D is effected by the lateral deviations in the path of this cam from the zero or starting position ST to the point 3W, 6W, 10W and 15W, respectively. According to the above it is to be noted that (1) the movement of the wire guiding member 115 for the winding of the initial or first three turns of a two-layer coil is imparted by the portion of cam 30 included from zero or starting point ST to the mark 3W; (2) for a three-layer coil from zero to the mark 6W; (3) for a four-layer coil from zero to 10W; and (4) for a five-layer coil from zero to 15W, that is, three hundred and sixty degrees or a complete turn of cam 30.

The points 3W, 6W, 10W, 15W of cam 30 are the positions wherein for a two, three, four and five-layer coil, the plunger 87 is disengaged from this cam by the downward movement of plate 66 through the operation of arm 67 itself under control of cam 34 which is set as the case may be on the marks 2, 3, 4 and 5 printed on cam 30 as shown in Fig. 4 prior to the winding operation and therefore represent positions corresponding to the number of layers comprising a particular coil that is, two, three, four and five layers.

As above described the disengagement of plunger 87 from cam 30 is effected simultaneously with the engagement of plunger 86 with the cam 28 at a point ST1 of this cam.

The space relation of plungers 86 and 87 with respect to the point ST1 of cam 28, Fig. 15 and the points 3W, 6W, 10W and 15W of cam 30 shown in Fig. 14 is effected by engaging one of the notches $2x$, $3x$, $4x$ and $5x$ of bar 144 shown in Figs. 1 and 13 with the stud 131 carried by the bar 85.

The movement of cam 28 upon the engagement of plunger 86 with this cam is effective to impart a swinging movement to the wire guiding member 115 an angular distance corresponding to half the base of triangle 15H1, 15H2, 15H3 and 15H4, such variations being indicated by $a$ in Fig. 16A, $b$ in Fig. 16B, $c$ in Fig. 16C and $d$ in Fig. 16D, but since the amplitude of the path of cam 28 is made to correspond to the distance $d$ for a five-layer coil and for a medium sized wire $w$ when the pivot 113 of wire guiding member 115 is in the position indicated in Fig. 1, the amplitude required or corresponding to the angles $a$, $b$, $c$ and $d$ in Figs. 16A, 16B, 16C and 16D, above mentioned is obtained by engaging the pivot 129 in the screw threaded holes 2, 3, 4 and 5 of this lever which positions correspond as above specified to the number of layers comprising the coil.

Upon each turn of cam 28 and therefore of the commutator CM, the magnetic clutch MC is operated as above described for moving the carriage 21 towards the other end of the core M2, in a step-by-step movement of an amplitude corresponding to the size of wire W as defined by the position of brush 61 on the segmental portion 59 and a handwheel HW secured to the end of lead screw 17 is provided for manually returning the carriage 21 in its starting position at the left end of the core M2 at the completion of each winding operation, but it is to be noted that the segmental portion 59 of commutator CM is so related to the cam 28 as to cause the operation of the magnetic clutch MC and the carriage 21 controlled thereby during the passing of that portion of the cam 28 limited by the points ST1 and ST2 for a purpose that will be hereinafter described in detail.

On the carriage 21 is mounted a vertically extending support 151 shown in Figs. 1, 2, 3 and 4 for pivotally mounting in the end thereof a bearing 152. This bearing, in turn, is provided for pivotally mounting a wire holding finger 153, this finger being pressed against the side of the wire pile-up as shown in Fig. 1 by a spring 154 which tends to move the bearing portion 152 in a horizontal plane and a spring 155 which tends to rotate the wire holding member in a vertical plane, thus permitting this wire holding member to adjust itself automatically with respect to the configuration of the side of the wire pile-up during the winding operation of the coil.

In a typical example of winding operation for a three-layer coil, for example, one end of the wire W to be wound on the core M2 is hooked in any ordinary manner to a pin 165 and wound one turn on the core M2 manually preparatory to the winding operation.

The cam 34 is adjusted on the cam 30 in the position indicated in Fig. 4, that is, with its effective portion in registry with the numeral 3 or one hundred and forty-four degrees from the starting point ST of cam 30. The machine is rotated as by the movement of handwheel 170 on the armature shaft of motor 34 as to place the starting point ST of cam 30 shown in Fig. 14 in registry with plunger 87 and this plunger is manually engaged with this cam and retained in such engagement by the plate 66 under the tension of spring 163. Plunger 86 carried by lever 128 is at this time disengaged from cam 28. The knob 129 is engaged with the hole 3 of lever 128 as to operate the bar 85 and the wire guiding member 115 an angular distance corresponding to angle b, Fig. 16B when cam 28 is rendered effective upon the engagement of plunger 86 therewith. Pivot 131 is then engaged with the notch 3x of bar 144 as to obtain the proper space relation between the plungers 86 and 87 with respect to the distance between the point ST1 of cam 28 and the point 6W of cam 30 in Figs. 13, 14 and 15. In the adjusted position of cam 34, roller 127 carried by arm 97 rests on the periphery or noneffective portion of this cam and therefore the contact piece 100, Fig. 4, carried by arm 99 on shaft 96 does not bridge the contacts 101 and 102 and the circuit for the magnetic clutch MC is not closed at this point.

The gear selecting rod 70 is moved axially for engaging the pin 69, Fig. 7, with the gear 50y, thus locking this gear with the shaft 64 for driving the gear 50 and thereby the commutator CM and cam 28. The speed ratio of commutator CM and therefore of the cam 28 with respect to the arbor 15 with respect to the coil bore M2 is, as above described, of the order of 3 to 1, that is, three turns of the core M2 for one turn of the cam 28. Upon the adjustment of rod 70, the latching lever 72, Figs. 1, 7 and 12, is moved in engaged relation with the annular groove F3 in rod 70 for holding it in its adjusted position with respect to gear 50y.

The brush 61 is moved laterally on the bar 62 in registry with the mark on the scale 63 indicating the size of the wire used for the winding of the coil, but it is to be noted that the passing of the segmental portion 59 in contact with the brush 84 is so timed as to occur in sequence with the operation of wire guiding member 115 when acted upon by that portion of cam 28 limited by the points ST1 and ST2. Upon the setting of the starting point ST of cam 30 in registry with plunger 87, the wire guiding member 115 through its engagement with the bar 85 is positioned in juxtaposition with the wire No. 1 of triangle 15H2 shown in Figs. 1, 14 and 16B for the winding of this first turn of the coil.

Upon the starting of the machine through the closure of the motor circuit through the operation of an ordinary switching device (not shown), the core M2 is rotated and the wire guiding member 115 is moved in a uniform motion from the starting point ST of cam 30 to the point 2 of this cam, that is forty-eight degrees from its starting position, thus winding turns 1 and 2. The direction of movement of wire guiding member 115 is then deviated from positions 2 to 3W for winding turns No. 3 at the intersecting point of turns 2 and 3 when the direction of guiding member and therefore the wire W is deviated for winding the turn No. 4 when the movement of wire W is again deviated for winding turns 5 and 6, thus reaching the point 6W of this cam, that is, one hundred and forty-four degrees from its starting point ST, when that portion of coil represented by the triangle 15H2 is completed. The effective surface of cam 34, Fig. 4, which has been set one hundred and forty-four degrees from the starting point ST of cam 30 now engages roller 127 for imparting a small angular movement to shaft 96 and thereby engaging the plunger 86 with the cam 28 at its starting point ST1 and simultaneously releasing the plunger 87 from cam 30 through the engagement of lever 67 with the plate 163.

The turning movement of shaft 96 is also effective to move the arm 99 in position for engaging the contact piece 100 carried thereby with contacts 101 and 102, for closing the energizing circuit of magnetic clutch MC at this point, such energization being timed to occur upon the movement of cam 28 from its starting position ST1 to point ST2, and this movement of cam 28 occurring upon the passing of segment 59 in contact with the brush 61 for energizing the magnetic clutch MC.

The combined movement of cam 28 and the carriage 21 upon the operation of the magnetic clutch MC is effective to operate the wire guiding member 115 through its engagement with this bar 85 an angular distance corresponding to angle b, Fig. 16B, that is, to move this member from the turn No. 6 to turn No. 4 while the movement of the carriage under control of the magnetic clutch is moved, as above described, a distance equal to the size of the wire used, thus placing this wire in position for winding wire turn No. 7, plunger 86 at this cycle of operation is at the point ST2 of cam 28. The continued movement of cam 28 from the point ST2 to point ST1 due to its 3 to 1 speed ratio with respect to core M2 is effective to move the wire guiding member 115 for the winding of turns 8 and 9 when the positions ST1 and ST2 reverse the movement of the wire guiding member 115 and the magnetic clutch energizes in the circuit above described for operating the screw 17 and thereby the carriage 21 a distance corresponding to the diameter of wire W, this sequence of operation being continued to the completion of the coil at the other end of the core when plunger 86 is disengaged from cam 28 by the manual operation of handle 126 and the latching lever 88 actuated thereby, this plunger automatically returning to its normal position under the tension of spring 133 shown in Fig. 5.

The amplitude of movement of wire guiding member 115 with respect to its operating bar 85 for the winding of different size wires is effected by adjusting the pivot 113 with respect to the scale 122 through the movement of the slide rest 112 as above described. Similarly, the linear movement of carriage 21 for the winding of different size wires is effected by adjusting the brush 61 on the segmental portion 59, such adjustment being indicated by the scale 63 shown in Figs. 1, 7, and 8.

It is understood that this machine is not limited to the winding of a two, three, four and five-layer coil since the length of the path of cam 30 could be increased for the winding of coils having any desired number of layers and that additional sets of gears such as 49, 49y, etc., could be embodied in the machine for the driving of cam 28 together with the other adjustments such as the setting of bar 144 and providing a greater number of setting positions for the cam 34. These and other minor changes, such as the substitution of certain of the mechanisms above described by equivalent combination of parts, could be made in this machine without departing from the spirit of the invention.

What is claimed is:

1. A machine for winding bank wound coils comprising a core, means for rotating the core, a lead screw, a carriage movable in a line parallel to the core and actuated by said screw, a gearing mechanism and a magnetically operable clutching device for controlling the operation of said screw, a yoke pivotally mounted on said carriage and having means for engaging the wire and a plurality of independently operable camming devices for imparting a series of non-uniform reverting movements to said yoke in timed relation with respect to the movement of said carriage for guiding the wire on the core.

2. In a machine for winding bank wound coils, a core, means for rotating said core, a yoke for guiding the wire on said core, a cam for operating said yoke for winding a portion of the coil on said core, another cam for operating said yoke for winding the complementary portion of the coil on said core and a plurality of selective gear mechanisms for actuating the last mentioned cam according to the number of superposed layers to be wound on said core.

3. In a machine for winding bank wound coils, a core, means for rotating said core, a wire guiding member, a carriage for supporting said member, a cam operable for operating said member for winding a portion of the coil on said core, another cam and electromagnetic means associated with said cam operable for imparting different movements to said member for winding the complementary portion of the coil on said core.

4. A machine for winding bank wound coils, a core, means for rotating the core, a yoke for guiding the wire on said core, a carriage for suppoting said yoke, electromagnetic means for operating said carriage, a circuit for energizing said means, means operable in conjunction with said carriage for actuating said yoke in a plurality of different movements for winding the coil in a number of differently wound sections and means adjustable in said circuit for changing the operation of said carriage according to the size of wire used for the winding of the coil.

5. A machine for winding bank wound coils, a core, means for actuating said core, a carriage, a wire guiding member pivoted on said carriage, a bar connected to said member, a cam for actuating said bar for moving said member in a series of pivotal movements of constantly decreasing amplitude for winding a portion of said coil with a triangular formation on said core, another cam normally ineffective with respect to said guiding member, a lever actuated by the last mentioned cam and connected to said bar, means defining a lever mechanism automatically operable for rendering the second mentioned cam effective with respect to said guiding member and simultaneously rendering the first mentioned cam ineffective with respect to said bar and means magnetically operable in conjunction with the second mentioned cam for imparting movements of different characters to said guiding member for winding the complementary portion of the coil on said core.

6. In a coil winding machine, a core, means for rotating said core for winding the wire thereon, a normally stationary carriage, means pivotally mounted on said carriage for guiding the wire on said core, a plurality of independently movable cams, the movement of one of said cams actuating said pivoted member for winding a portion of the coil with a triangular formation, a lever mechanism for rendering the movement of said cam ineffective with respect to said pivoted member and simultaneously rendering the movement of the other cam effective with respect to said member, and means operable upon the operation of said mechanism and cooperating with the last-mentioned cam for winding the complementary portion of the coil on said core in a plurality of superposed turns adjacent one side of the first-mentioned portion.

7. In a machine for winding bank wound coils, a core, means for rotating said core, a yoke for guiding the wire on said core, a plurality of means for operating said yoke, said means comprising a pair of independently operated cams, a bar connected at one end to said yoke and actuated by the movement of said cams independently, a plunger carried by said bar for engaging one of said cams for moving said yoke for winding a portion of the coil, another cam, a shaft operable through the movement of the other cam for disengaging said plunger from said cam for rendering it ineffective with respect to said bar and a plunger actuated by the movement of said shaft to render the other cam effective with respect to said bar for winding the complementary portion of the coil on said core.

8. In a machine for winding bank wound coils, a core, means for actuating said core, a member for guiding the wire on said core, a carriage for supporting said member, means for actuating said member, said means comprising a bar mounted on said carriage and connected to said member, a cam, a plunger carried by said bar and movable for engaging said cam for actuating said bar to cause the operation of said guiding member for winding a portion of the coil on said core, another cam, a lever pivoted on said carriage, a plunger carried by said lever normally disengaged from the last mentioned cam, another bar operatively connecting said lever to the first mentioned bar, a rotatable lead screw for moving said carriage in line parallel to said core, a gearing mechanism normally ineffective with respect to said lead screw, a magnetic clutch device for rendering said gearing mechanism effective, a normally open energizing circuit for said device, a plurality of contacts operable for closing said circuit to render said mechanism effective for actuating said lead screw in conjunction with the movement of the last mentioned cam for operating said guiding member in a plurality of movements of different characters for moving said guiding member for winding the complementary portion of the coil on said core.

9. In a machine for winding bank wound coils, a core, means for actuating said core, a wire guiding member, a carriage for mounting said member, a normally ineffective mechanism for operating said carriage in line parallel to said core, a pair of cams, a plurality of normally ineffective gear mechanisms for independently actuating one of said cams, means manually operable to render the other of said cams effective with respect to said member for winding a portion of the coil on said core, and means automatically operating to render said effective cam ineffective and to render the other cam effective, an electromagnetic means operating in conjunction with the last mentioned cam for moving said carriage for changing the position of said member upon each turn of the last mentioned cam for winding a complementary portion of the coil on said core.

10. In a machine for winding bank wound coils, a core, means for rotating said core, a member for guiding the wire on said core, a carriage movable in a line parallel to said core and for pivotally mounting said member, a lead screw for moving said carriage, a plurality of cams operable for imparting oscillatory movement of different characters to said member, a normally ineffective gear mechanism for actuating said screw and means operable upon the movement of one of said cams to render said mechanism effective for actuating said screw for moving the carriage in timed relation with respect to the other cam for imparting a series of movements to said member for guiding the wire on said core.

11. A machine for winding bank wound coils, comprising a frame structure, a head stock having a driving spindle and a tail stock for rotatably receiving the core, a lead screw rotatably mounted on said frame, a normally ineffective gearing mechanism for rotating said screw, a carriage movable in a line parallel to said core through the movement of said screw, a member for guiding the wire mounted on said carriage, a shaft geared to said spindle, a cam actuated by said shaft, a hollow shaft concentrically mounted on said shaft, a plurality of selective gear mechanisms operatively connecting said spindle to said hollow shaft, a cam operated through the movement of said hollow shaft, each of said cams imparting different movements to said wire guiding member and means to render the first mentioned gear mechanism effective with respect to said screw for moving said carriage in timed relation with respect to the last mentioned cam for winding the wire on said core.

12. In a machine for winding bank wound coils, a core, means for actuating said core, a wire guiding member, a plurality of mechanisms actuated by said means for moving said member in a pivotal movement for winding a portion of the coil in a triangular formation and in a combined pivotal and rectilinear movement for winding superposed turns parallelly and in a number of turns equal to one side of the triangular portion to form the complemental portion of the coil.

13. In a coil winding machine, a core, means for rotating said core, a wire guiding member, a cam for actuating said member for guiding the wire on said core for winding a portion of the coil in a triangular formation, another cam, and electromagnetic means cooperating with the last-mentioned cam for imparting series of different movements to said guiding member preceding the movement of the first-mentioned cam for winding the complemental portion of the coil in a number of successive turns in superposed relation and adjacent one side of the first-mentioned portion.

CARL A. BIELING.
CHARLES D. RICHARD.